O. T. AASEN.
THILL COUPLING.
APPLICATION FILED FEB. 24, 1914.

1,192,148.

Patented July 25, 1916.

Witnesses.

Inventor:
Ole T. Aasen,
by Bradbury.
Attorney.

UNITED STATES PATENT OFFICE.

OLE T. AASEN, OF STARBUCK, MINNESOTA.

THILL-COUPLING.

1,192,148.

Specification of Letters Patent.   Patented July 25, 1916.

Application filed February 24, 1914. Serial No. 820,400.

*To all whom it may concern:*

Be it known that I, OLE T. AASEN, a citizen of the United States, residing at Starbuck, in the county of Pope and State of Minnesota, have invented a certain new and useful Improvement in Thill-Couplings, of which the following is a specification.

The primary object of this invention is the production of a thill coupling, which is adapted to produce a positively locked engagement between a thill and coupling bolt to prevent accidental disengagement thereof, but permitting of ready separation when desired. These features are accomplished by my invention by the use of specific means which is extremely simple in construction and effective in operation.

Figure 1:
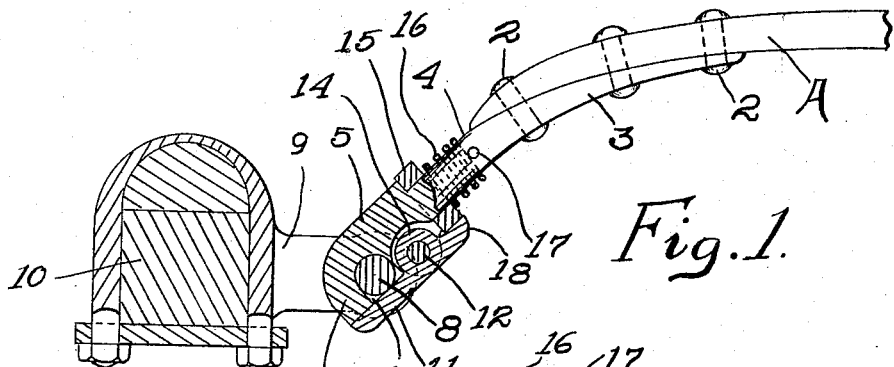
Figure 2:
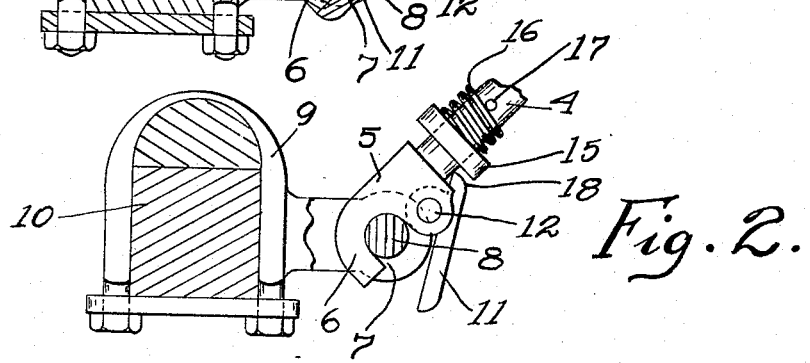
Figure 3:
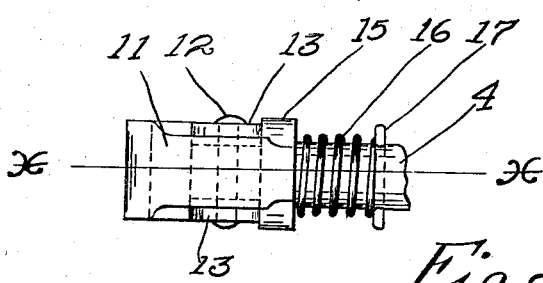

In the accompanying drawing forming part of this specification, Figure 1 is a side elevation of a detail of a thill showing the application of my invention thereto, portions of said parts being shown in section, the section being taken on the line X—X of Fig. 3; Fig. 2 is a side elevation partly in section of a detail showing the thill coupling in position to be disengaged from a coupling bolt, and Fig. 3 is a plan of a detail of a thill showing my invention applied thereto.

A represents a portion of a thill to which is attached such as by rivets 2, a thill iron 3, said thill iron being formed with a round shank 4 and a coupling head 5 on the lower end of said shank having a hook 6. This hook is adapted to be placed with its recess 7 over the ordinary coupling bolt 8 carried by the clip 9 of usual construction, which is attached to the axle 10 of the vehicle. Lying across the throat of the hook 6 is a block arm 11, which is pivoted upon a shaft 12 between a pair of bosses 13, which are integral with and project from the lower side of the head 5, said shaft 12 being in the form of a rivet passing through a lug 14 on the block arm, and said bosses. The long end of the block arm closes the passage entering the hook to prevent disengagement of the coupling element from the coupling bolt, and the short end is free to swing up and down over the shank 4. To lock the block arm in closed position across the passage entering the hook a ring 15 is slidably disposed on the shank and adapted to slide below the short end to hold said arm in closed position. A coil spring 16 placed about the shank 4 and held under tension against the lock ring by means of a pin 17 passing through said shank tends to hold the lock ring below the short end of the block arm. To disengage the coupling head from the coupling pin, the lock ring is moved back against the tension of the spring 16 from below the short end of the block arm, whereupon said block arm is free to tilt down into open position as illustrated in Fig. 2, permitting the coupling element to be removed from the coupling bolt. The end of the block lever is formed with a curved or beveled shoulder 18 against which the lock ring 15 acting under the pressure of the spring 16 is adapted to impinge and hold the block arm in open position until the coupling element is engaged over the coupling bolt. When the block lever is closed over the coupling bolt as illustrated in Fig. 1, the lock ring slides below the short end of the block arm and locks the latter in closed position.

The construction of my invention results in the production of a coupling element which can be very easily and quickly attached to or detached from a coupling bolt and making it easy to shift a thill from one position on an axle to another.

In accordance with the patent statutes, I have described the principles of operation of my invention, together with the apparatus which I now consider to represent the best embodiment thereof, but I desire to have it understood that the construction shown is only illustrative and that the invention can be carried out by other means and applied to uses other than those above set forth within the scope of the following claims.

Having described my invention, what I claim as new and desire to protect by Letters Patent is:—

In a thill-coupling, the combination with a fixed jaw terminating at one end in a hook portion having a squared end, said jaw being reduced adjacent its other end to form a shank adapted for attachment to a thill, and being provided with a square shoulder at the intersection of the shank and jaw, a second jaw pivoted adjacent one end to said first mentioned jaw and having its longer portion adapted to seat upon the squared end of said hook portion, and a ring slidable upon the shank of said fixed jaw adapted to abut said shoulder and to engage under the shorter portion of said pivoted jaw to hold the same positively seated.

In testimony whereof, I have signed my name to this specification, in the presence of two subscribing witnesses.

OLE T. AASEN.

Witnesses:
 GEO. W. HUGHES,
 B. C. BERGERSON.

Copies of this patent may be obtained for five cents each, by addressing the "Commissioner of Patents, Washington, D. C."